US012638111B2

(12) United States Patent
Benson

(10) Patent No.: US 12,638,111 B2
(45) Date of Patent: May 26, 2026

(54) ADAPTER SYSTEMS

(71) Applicant: Jeffrey Glen Benson, Sweetwater, TN (US)

(72) Inventor: Jeffrey Glen Benson, Sweetwater, TN (US)

( * ) Notice: Subject to any disclaimer, the term of this patent is extended or adjusted under 35 U.S.C. 154(b) by 52 days.

(21) Appl. No.: 18/814,553

(22) Filed: Aug. 25, 2024

(65) Prior Publication Data

US 2026/0055833 A1 Feb. 26, 2026

(51) Int. Cl.
*F16L 21/08* (2006.01)
*F16L 21/00* (2006.01)

(52) U.S. Cl.
CPC ............. *F16L 21/08* (2013.01); *F16L 21/002* (2013.01)

(58) Field of Classification Search
CPC ........ E03F 1/008; F16L 21/002; B60R 15/00; B60R 15/04
See application file for complete search history.

(56) References Cited

U.S. PATENT DOCUMENTS

| | | | | | |
|---|---|---|---|---|---|
| 4,758,027 | A | * | 7/1988 | Todd | E03F 1/008 |
| | | | | | 285/179 |
| 5,141,017 | A | * | 8/1992 | Trottier | E03F 7/00 |
| | | | | | 137/355.16 |
| 5,904,183 | A | * | 5/1999 | Leech | B60R 15/00 |
| | | | | | 137/355.16 |
| 2004/0084098 | A1 | * | 5/2004 | Swarts | B60R 15/04 |
| | | | | | 137/899 |
| 2005/0150562 | A1 | * | 7/2005 | Anderson | B60R 15/00 |
| | | | | | 137/899 |
| 2009/0236001 | A1 | * | 9/2009 | Damaske | B60R 15/00 |
| | | | | | 137/899 |
| 2019/0352893 | A1 | * | 11/2019 | Wright | E03F 1/008 |

* cited by examiner

*Primary Examiner* — Matthew Troutman
*Assistant Examiner* — James A Linford

(57) ABSTRACT

An adapter system including an adapter having a body defined by a proximal end, a distal end, and a through-hole; wherein the proximal end has external threads on an outer circumference and a smooth inner circumference. The proximal end is integral with the distal end. The distal end is stepped with a step; the step having inserts on an inside peripheral surface and locks. The locks have channels and a smooth outside peripheral surface. The adapter is configured for use in functional conjunction with piping to connect an rv to a wastewater dump.

2 Claims, 3 Drawing Sheets

ADAPTER SYSTEMS

COPYRIGHT NOTICE

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of fittings and more specifically relates to coupler fittings.

2. Description of the Related Art

Pipes may be used to provide transport means for fluids between locations. Recreational vehicles (rvs) may be used to transport people between locations. Further rvs may be used for the occupants to rest in. Many rvs have indoor plumbing needing to have potable water ingress and wastewater egress. The plumbing may comprise pipes that can be coupled together and uncoupled when desired. An adapter that is conducive to this is desired.

Various attempts have been made to solve the above-mentioned problems such as those found in U.S. Pat. No. 4,010,966 to Paul G Vanden Bosch. This art is representative of coupler fittings. None of the above inventions and patents, taken either singly or in combination, is seen to describe the invention as claimed.

Ideally, an adapter system should provide ease of coupling with sealing capability and, yet would operate reliably and be manufactured at a modest expense. Thus, a need exists for a reliable adapter system to avoid the above-mentioned problems.

BRIEF SUMMARY OF THE INVENTION

In view of the foregoing disadvantages inherent in the known coupler fittings art, the present invention provides a novel adapter system. The general purpose of the present invention, which will be described subsequently in greater detail is to provide an easy-to-use reliable sealing means.

An adapter system is disclosed herein, in a preferred embodiment, comprising: an adapter having a body defined by a proximal end, a distal end, and a through-hole; wherein the proximal end comprises external threads on an outer circumference and a smooth inner circumference. The proximal end is integral with the distal end (forms a single construction). The distal end is stepped with a step; the step comprising inserts on an inside peripheral surface and locks. The locks comprise channels and a smooth outside peripheral surface. The adapter is configured for use in functional conjunction with piping to connect an rv to a wastewater dump or other. The adapter thread allows the adapter to screw into another pipe and the locks enable locking to the pipe. The adapter has a front that is able to receive a pipe. In this way pipes can be coupled and uncoupled for convenient use.

The body comprises pvc (or other suitable equivalent material) in preferred embodiments. The locks allow locking to occur with the piping, as mentioned. The external threads allow screw-threading-coupling and screw-un-coupling with and from the piping. The locks run parallel to the body; wherein the locks are arcuate. The locks conform to the outer circumference. The locks alternate between small locks and large locks. The small locks comprise a width equal to that of the large locks, and the small locks comprise a length less than that of the large locks, relationally speaking. The small locks are located adjacent to the inserts. The small locks each comprise a stop. The inserts comprise straight-walls and non-straight-walls, as shown. The inserts comprise different size openings extending from the distal end (adapter front).

The present invention holds significant improvements and serves as an adapter system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, adapter system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a coupler fitting and more particularly to an adapter system as used to improve the ease of use, convenience and sealing of piping systems for use with rvs or other piping combinations for plumbing.

Figure 1:
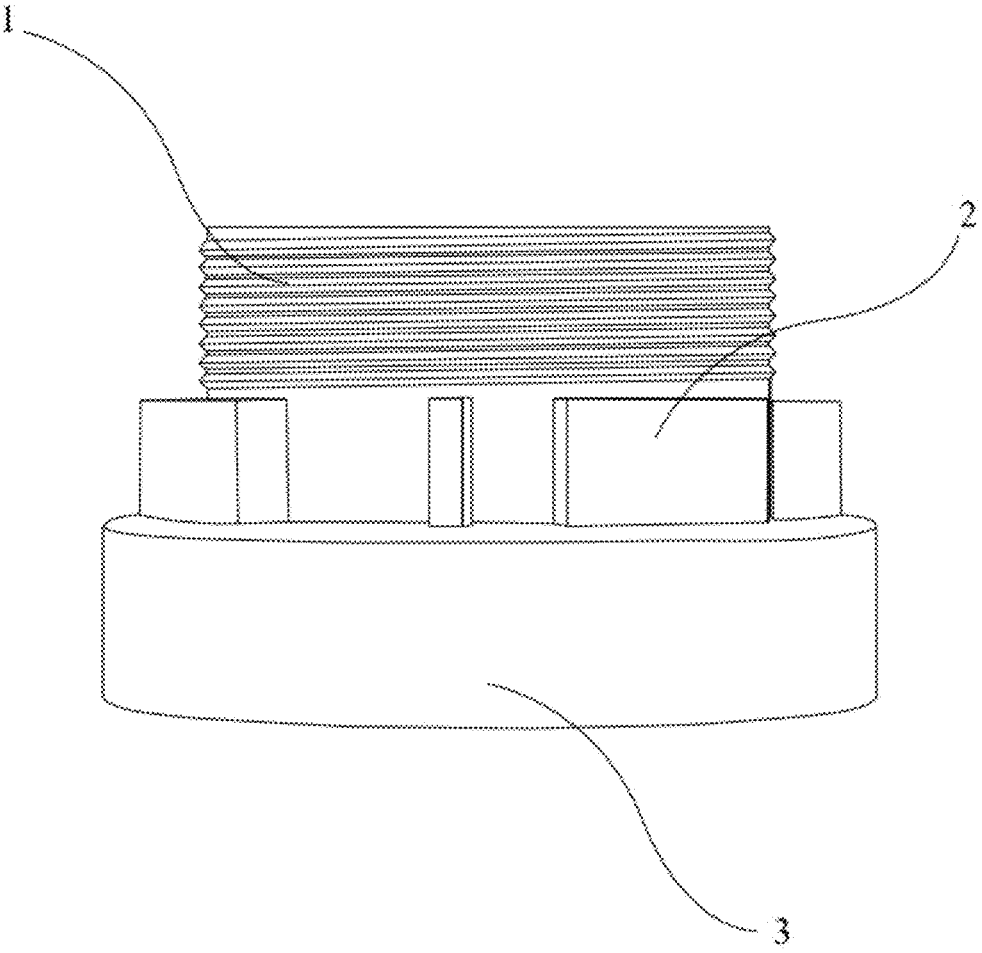
FIG. 1 shows a side view illustrating an adapter of the adapter system (adapter front facing down) according to an embodiment of the present invention.
Figure 2:
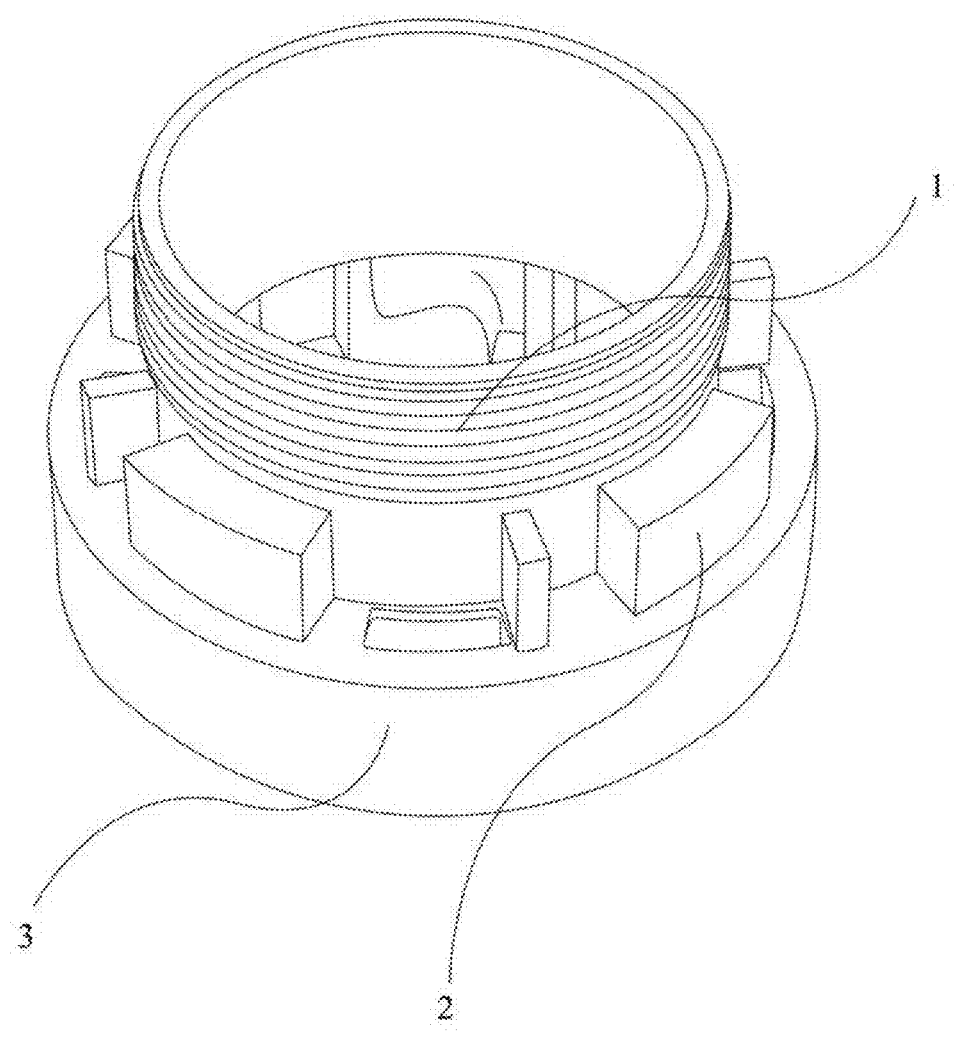
FIG. 2 is a perspective view illustrating the adapter according to an embodiment of the present invention of FIG. 1.
Figure 3:
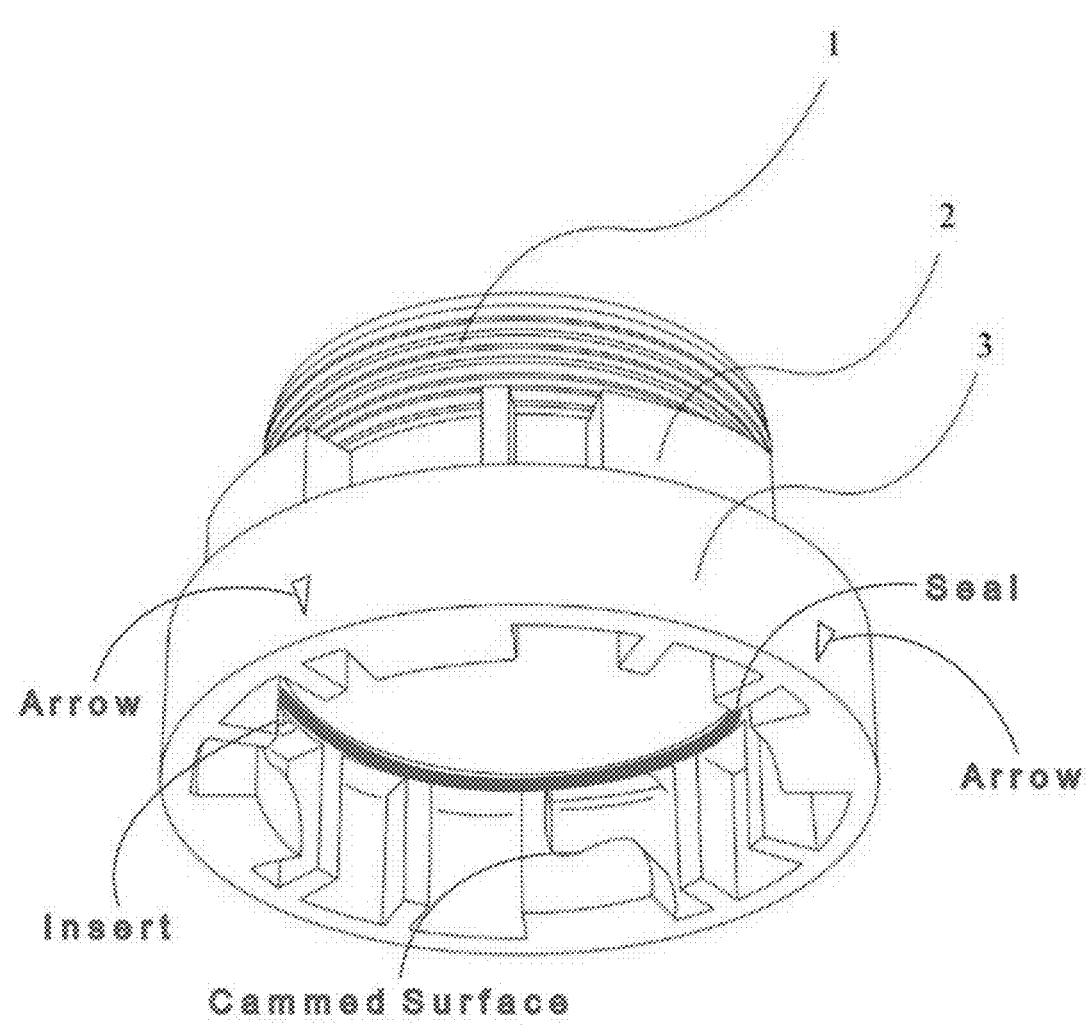
FIG. 3 is a perspective view illustrating the adapter (adapter front down) according to an embodiment of the present invention of FIG. 1.

Referring to the drawings by numerals of reference there is shown in FIGS. 1-3, an adapter system comprising at least the following components: adapter thread 1 allows the adapter to screw into another pipe; adapter locks 2 allow the adapter to lock into another pipe; adapter front 3 allows the adapter to connect with another pipe.

The adapter system comprises: an adapter having a body defined by a proximal end, a distal end (adapter front 3), and a through-hole; wherein the proximal end comprises external threads (adapter thread 1) on an outer circumference and a smooth inner circumference. The proximal end is integral with the distal end (adapter front 3); wherein the distal end (adapter front 3) is stepped with a step; the step comprising inserts on an inside peripheral surface and locks, the locks comprising channels and a smooth outside peripheral surface. As designed the adapter is configured for use in functional conjunction with piping (various pipes and combinations thereof) to connect an rv to a wastewater dump. The body preferably comprises pvc.

The locks 2 of the adapter system allow locking to occur with the piping (pipes). The external threads 1 allow screw-threading-coupling with the piping. The external threads 1 allow screw-threading-un-coupling from the piping. The locks 2 run parallel to the body, as shown in FIG. 2 and the locks 2 are arcuate and as such the locks 2 conform to the outer circumference. The locks 2 alternate between small locks 2 and large locks 2. The small locks 2 preferably comprise a width equal to that of the large locks 2, as shown in FIG. 2. The small locks 2 preferably comprise a length less than that of the large locks 2, also shown. The locks 2 also comprise wrench grips that may be concaved, convex (FIGS. 2 and 3) or flat, as shown in FIG. 1. The ring seal is shown and provides sealing means. Four indicator arrows are included to provide indication means to insert a bayonet fitting (where the 4 nipples located on the bayonet coupling get inserted for turning and friction locking to the present invention). As the nipples engage the locks the nipples are push-rotated against the cammed surface until an audible click is heard indicating that the bayonet coupling is seal-connected to the present invention. The adapter may comprise a 3-inch inner diameter to allow coupling to 3-inch diameter piping.

The small locks 2 are located adjacent the inserts; wherein the small locks 2 each comprise a stop (stopping means). The inserts comprise straight-walls and others comprise non-straight-walls, as shown in FIG. 3. The inserts of the adapter system comprise different size openings from the distal end, also shown in FIG. 3.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An adapter system comprising: an adapter having a body defined by a proximal end; a distal end; a seal; and a through-hole; wherein said proximal end comprises external threads on an outer circumference and a smooth inner circumference; wherein said proximal end is integral with said distal end; wherein said distal end is stepped with a step, said step comprising inserts on an inside peripheral surface and locks, said locks comprising channels and a smooth outside peripheral surface; and wherein said adapter is configured for use in functional conjunction with piping to connect an rv to a wastewater dump, wherein said body comprises pvc and wrench grips, wherein said locks run parallel to said body, wherein said locks are arcuate, wherein said locks conform to said outer circumference, wherein said locks alternate between small said locks and large said locks, wherein said small said locks comprise a width equal to that of said large said locks, wherein said small said locks comprise a length less than that of said large said locks, wherein said small said locks are located adjacent said inserts, wherein said small said locks each comprise a stop, and wherein said inserts comprise different size openings from said distal end.

2. An adapter system comprising: an adapter having a body defined by a proximal end; a distal end; a ring seal to provide sealing means; and a through-hole; wherein said proximal end comprises external threads on an outer circumference and a smooth inner circumference; wherein said proximal end is integral with said distal end; wherein said distal end is stepped with a step, said step comprising inserts on an inside peripheral surface and locks, said locks comprising channels and a smooth outside peripheral surface; wherein said adapter is configured for use in functional conjunction with piping to connect an rv to a wastewater dump; wherein said body comprises pvc; wherein said locks allow locking to occur with said piping; wherein said external threads allow screw-threading-coupling and screw-un-coupling with and from said piping; wherein said locks run parallel to said body and provide wrench grips; wherein said locks are arcuate; wherein said locks conform to said outer circumference; wherein said locks alternate between small said locks and large said locks; wherein said small said locks comprise a width equal to that of said large said locks; wherein said small said locks comprise a length less than that of said large said locks; wherein said small said locks are located adjacent said inserts; wherein said small said locks each comprise a stop; wherein said inserts comprise straight-walls and non-straight-walls; wherein indicator arrows are included to provide indication means to insert a bayonet fitting; and wherein said inserts comprise different size openings from said distal end.

* * * * *